US008562160B1

(12) United States Patent
Knapp

(10) Patent No.: US 8,562,160 B1
(45) Date of Patent: Oct. 22, 2013

(54) CHEMILUMINESCENT APPLICATION SYSTEM

(76) Inventor: Mario Knapp, Miami, FL (US)

( * ) Notice: Subject to any disclaimer, the term of this patent is extended or adjusted under 35 U.S.C. 154(b) by 423 days.

(21) Appl. No.: 13/036,291

(22) Filed: Feb. 28, 2011

Related U.S. Application Data

(60) Provisional application No. 61/308,961, filed on Feb. 28, 2010.

(51) Int. Cl.
*F21K 2/00* (2006.01)
*B60Q 1/12* (2006.01)

(52) U.S. Cl.
USPC .............................................. 362/34; 362/84

(58) Field of Classification Search
None
See application file for complete search history.

(56) References Cited

U.S. PATENT DOCUMENTS

| | | | | |
|---|---|---|---|---|
| 3,774,022 | A | 11/1973 | Dubrow et al. | |
| 3,940,605 | A | 2/1976 | Gerber | |
| 4,089,797 | A | 5/1978 | Heller et al. | |
| 4,379,320 | A | 4/1983 | Mohan et al. | |
| 4,706,568 | A | 11/1987 | Lundwall et al. | |
| 5,018,450 | A | 5/1991 | Smith | |
| 5,381,311 | A | 1/1995 | Fujita | |
| 5,709,449 | A | 1/1998 | Kno | |
| 6,458,547 | B1 * | 10/2002 | Bryan et al. | 506/9 |
| 6,497,181 | B1 | 12/2002 | Manole et al. | |
| 6,615,739 | B2 | 9/2003 | Gibson et al. | |
| 6,990,905 | B1 | 1/2006 | Manole et al. | |

* cited by examiner

*Primary Examiner* — Natalie Walford
(74) *Attorney, Agent, or Firm* — Smith Moore Leatherwood LLP; Thomas W. Epting

(57) ABSTRACT

An apparatus for dispensing chemiluminescent or fluorescent material where the material(s) for the production of the chemiluminescent or fluorescent material are housed in separate compartments and mix when they exit those compartments. Also disclosed is a method of illumination by dispensing materials housed in an apparatus where the materials do not mix until they exit that apparatus.

25 Claims, 2 Drawing Sheets

CHEMILUMINESCENT APPLICATION SYSTEM

This application claims the benefit of U.S. Provisional Application No. 61/308,961, filed Feb. 28, 2010, the entirely of the disclosure of which is expressly incorporated herein by reference.

The present invention is directed towards a system for the storage and application of chemiluminescent material.

BACKGROUND OF THE INVENTION

In dimly lit, dark, or completely dark situations it may be desirable for a light source be available for the safety and/or convenience of those finding themselves in such conditions. Battery-powered or electric light sources such as lanterns, headlamps and flashlights are not always available or effective because of power loss or limited sight distance. Ordinary lighting devices are typically not capable of leaving an illuminated trail that could be followed by one coming after or exiting the way the person leaving the trail has traveled, without leaving such device behind. Phosphorescent flares or other phosphorescent based light sources may be left behind to guide one coming after or exiting the way the person leaving the trail has traveled. However, phosphorescent light sources may be dangerous in situations where the smoke and the sparks they produce could be harmful.

A situation may be such that there are gasses, fumes or other flammable materials known or unknown in close proximity which could be ignited by the phosphorescent flares or other phosphorescent based light sources. For example, using a phosphorescent light source during a spelunking or caving outing could lead to an explosion from gaseous vapors that have built up underground. Both of these light sources are also problematic when a person in a dimly lit or completely dark situation wants to light what is in front of him or her a significant distance away, such as down a hole or further down a tunnel.

An optional light source available to people who find themselves in dark situations are chemiluminescent-based light sources. Those are usually found in the form of light sticks or glow sticks. These work by having chemicals in separate compartments. When the compartments are ruptured, the materials mix and interact to cause illumination, However, if the goal is to leave a trail to exit or for a person following behind, and the trip is an especially long one, it becomes impractical to carry the number of light sticks which may be necessary to create such a trail. Another disadvantage is that these light sources must be left on some type of generally horizontal surface and are not easily deposited on a vertical surface unless other materials, such as adhesives, fasteners, etc, are available.

SUMMARY OF THE INVENTION

In one embodiment, the present invention includes an apparatus that provides illumination, and which includes a first compartment and a first reactant in the first compartment. A second compartment includes a second reactant that reacts upon contact with the first reactant to produce a chemiluminescent material. An element is provided in communication with the first compartment and the second compartment that selectively allows the first reactant and the second reactant to react to produce the chemiluminescent material. A nozzle is provided that is in communication with the element that selectively dispenses the chemiluminescent material.

In another embodiment, the first reactant and the second reactant produce a fluorescent material upon contact.

Also in an embodiment of the present invention, one or more of the chemiluminescent materials may be in the form of a powder. In such an embodiment, it is contemplated that the powder may react with water or some other fluid to create illumination. It is contemplated that the powder may be in a gel matrix such that use in a damp environment will produce illumination while allowing the chemiluminescent material to adhere to, or be less susceptible to being washed away and/or dissipated from, a damp surface such as a cave wall or cave floor.

In another embodiment of the present invention, one or more of the chemiluminescent materials are pressurized such that the chemiluminescent material is released from the apparatus in the form of an aerosol.

In still another embodiment of the present invention, two or more of the chemiluminescent materials are released through separate orifices in such a manner that the chemiluminescent materials do not mix until they together hit a surface, causing mixing to occur which produces light.

In yet another embodiment of the present invention, one or more of the chemiluminescent materials may be activated by air such that illumination occurs when the chemiluminescent materials are mixed and exposed to air.

In a further embodiment, a chemiluminescent formulation such as disclosed in U.S. Pat. No. 4,089,797, issued to Hester et al., could be used, and the entirety of such patent is incorporated herein by reference.

In another embodiment of the present invention, the body of the apparatus 10 and the application element 20 may be configured in such a way that allows the user to manipulate the apparatus and throw or toss the apparatus after which the chemiluminescent material is released through one or more orifices. In one aspect of such an embodiment, the release of the chemiluminescent material may be dependent on a manipulable or set analog timer, digital timer, or mechanical timer, or a combination thereof.

In another aspect of such an embodiment, the apparatus may further comprise wheels, rollers, or other such means for allowing the apparatus to travel in one or more directions upon resting or landing on a surface.

In a still further embodiment of the present invention, the chemiluminescent materials, the device, or a combination thereof, additionally contain marking components such as dyes such that the dye remains after illumination has ceased. Examples of such dyes include, but are not limited to, liquid dyes, powder dyes, water soluble dyes, permanent dyes, and combinations thereof. Additional dyes may be used as a chemiluminescent material, such as infrared dyes, ultra violet dyes, chemiluminescent dyes, and combinations thereof. In another aspect, phosphorescent dyes may be used in addition to the chemiluminescent materials and/or dyes.

DETAILED DESCRIPTION OF THE INVENTION

Figure 1:
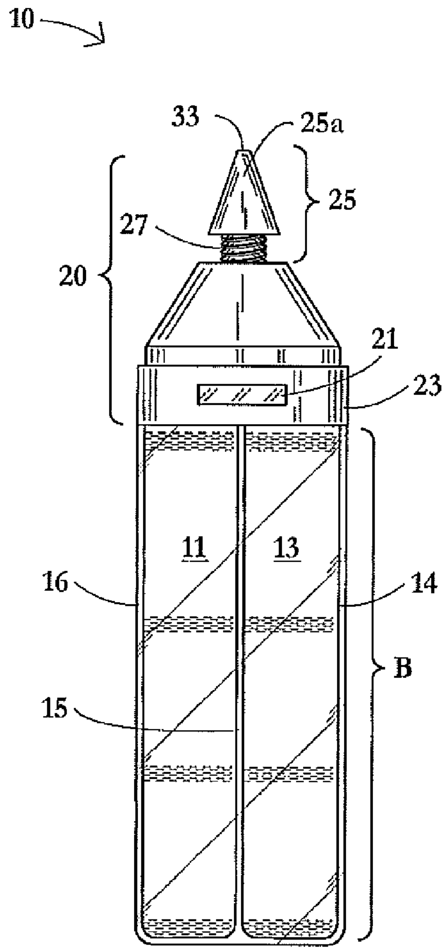
FIG. 1 is an elevational view, with parts cut away, of one embodiment of a chemiluminescent system constructed in accordance with the present invention.

Numerous other aspects of embodiments, embodiments, features, and advantages of the present invention will appear from the following detailed description and the accompanying drawings. In the description and/or the accompanying drawings, reference is made to exemplary aspects of embodiments and/or embodiments of the invention which can be applied individually or combined with each other. Such aspects of embodiments and/or embodiments do not represent the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of the present invention will become apparent from the following detailed description and the accompanying drawings.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

While typical aspects of embodiment and/or embodiments have been set forth for the purpose of illustration, the foregoing description and the accompanying drawings should not be deemed to be a limitation on the scope of the invention. Accordingly, various modifications, adaptations, and alternatives may occur to one skilled in the art without departing from the spirit and scope of the present invention. It should be understood that not all such modifications and improvements have been discussed herein for the sake of conciseness and readability but are properly within the scope of aspects of embodiments of the present invention. Numerous other aspects of embodiments, features, and advantages of the present invention will appear from the description and the accompanying drawings. In the description and/or the accompanying drawings, reference is made to exemplary aspects of embodiments and/or embodiments of the invention, which can be applied individually or combined in any way with each other.

The present invention includes a system configured to apply chemiluminescent material to a surface for illumination.

Generally, a chemiluminescent material is made up of at least two separate reactants and/or a fluorescent compound. Separately, these materials will not produce light. However, when they are mixed, a reaction takes place which creates the illumination. The two reactants may comprise, in one embodiment, or first, an oxalic-type ester, and second, a hydroperoxide. These reactants may be in the form of a liquid, powder, gel or a dispersion of material in a fluid, gel, or other fluid.

The composition of such fluorescent compound which could include an organic florescent substance and/or dye, may affect the wavelength of the light. The fluorescent compound may include metal, other organic and/or inorganic compounds known to one having skill in the art, or a combination of compounds which react with the chosen reactants to luminesce. One having ordinary skill in the art, upon reading the present disclosure, would be familiar with such fluorescent compounds and could choose one or more compounds suited to the application, situation and/or conditions in which the chemiluminescent material would be used, and such person could also determine the ratios at which the chemiluminescent material may be mixed to create a chemiluminescence that produces light for a period of time necessary for the application, situation or condition for which the chemiluminescent material is to be used. The wavelength of the light produced by the chemiluminescent material may be any wavelength visible to the human eye, any wavelength in the infrared spectrum, or any wavelength in the ultraviolet spectrum.

Examples of chemiluminescent materials for use in the present example include, without limitation: polysiloxene; hydrogen peroxide; potassium permanganate; manganese peroxide; chromic acid; persulfuric acid; mercurous nitrate; mercuric nitrate; ferric chloride; eerie ammonium sulfate; eerie ammonium nitrate; eerie sulfate; eerie oxide; cerium nitrate; potassium hexanitrate cerate; uranyl nitrate; uranyl acetate; potassium ruthenate; vanadium pentoxide; chromium trioxide; magnesium perchlorate; 5-amino-2,3-dihydro-1,4-phthalazinedione; copper-doped zinc suflate; nitrogen monoxide; methylselenide; cyanide; fluoromethylene; formaldehyde; hydrogen sulfoxide; iodine monofluoride; lucigene; lucigenin; lophine; luciferin; peroxyoxalate; tris(2-2'-bipyridyl)ruthenium(III); sulfur dioxide; sulfur difluoride; nitrogen dioxide; peroxide; tetrakis(dimethylamino)ethylene; other oxalic acid esters; isoluminol; peroxidase; bis-trichloropheyloxalate; various alkaloids reacted with potassium permaganate in the presence of polyphosphates; 9,10-bis(phenylethynyl)-anthracene; 5,6,11,12-tetraphenylnaphthacene; acridine orange (c.i. 46005); disodium fluorescein (c.i. 45350:1); 1-chloro-9,10-bis(phenyl-ethynyl)anthracene; rhodamine b (c.i. 45170); rhodamine 6 g perchlorate; 2-chloro-9,10-bis(phenyl-ethynyl)anthracene; 5,6,11,12-tetraphenylnaphthacene; 9,10-diphenylanthracene; 3-(2'-benzothiazolyl)-7-n,n-diethyl-aminocoumarin; perylene; pyrene; disodium fluorescein; 5,12-bis(phenylethynyl)-tetracene; and 16-17-dipeptaonyloxyviolanthrone; diethyloxatricarbocyanine.

FIG. 1 illustrates one embodiment of the current invention. The body, generally B, of the apparatus 10 may be generally cylindrical and divided into two or more elongated compartments 11, 13 to house the chemiluminescent material. It is contemplated that when a fluorescent compound is present, it may be housed in a compartment separate from the reactants, may be incorporated into a different area of the apparatus, may be incorporated into one of the reactants, or a combination thereof. The body of the apparatus 10 is removably or permanently attached to an application element, or, element, generally 20, which defines a mixing chamber. The application element 20 comprises an attachment portion 23 which removably or permanently attaches the application element 20 to the body B of the apparatus 10 by chemical means, mechanical means, or a combination thereof.

The application element 20 may also include a nozzle, generally 25, which provides an orifice 33 in communication with the compartments 11, 13 and through which the chemiluminescent materials may exit the apparatus. As shown in FIG. 1, cap, 25*a*, is threadingly connected to threads 27, and the nozzle 25 may be manipulated to close the orifice 33. The cap 25*a* may be configured to allow for its removal from the application element 20. The application element 20 may include a substantially transparent window 21 which may be used to view whether illumination is or is not occurring in the mixing chamber prior to the chemiluminescent materials exiting the apparatus. It is contemplated that the body of the apparatus 10 may be comprised of a flexible material such as polypropylene, which is capable of being distorted by the application of pressure to, or squeezing, the sidewalls 14, 16 of the body B of the apparatus 10. The body B of the apparatus 10 may include one or more barriers or dividers 15 to separate the chemiluminescent materials prior to exiting the apparatus. The barrier or divider 15 may be comprised of the same material as the body of the apparatus 10, may be comprised of a stiffer material which is not easily distorted by pressure placed on the outside edges 14, 16 of the body B of the apparatus 10, or may be comprised of a more flexible material as necessary for the situation or circumstances the apparatus is to be used.

The application element 20 of the apparatus is contemplated as comprising material not easily distorted by pressure but may be comprised of the same material as the body of the apparatus 10 and/or the barriers or dividers 15. It is contemplated that the application element 20 may be comprised of polypropylene or other suitable material. The materials used to create the body of the apparatus 10, application element 20, nozzle 25, and any part of the apparatus which may come in contact with the chemiluminescent material are preferably substantially unreactive to the chemiluminescent material it will contact, such that the apparatus is suitable for long-term or short-term storage of the chemiluminescent materials.

Figure 2:
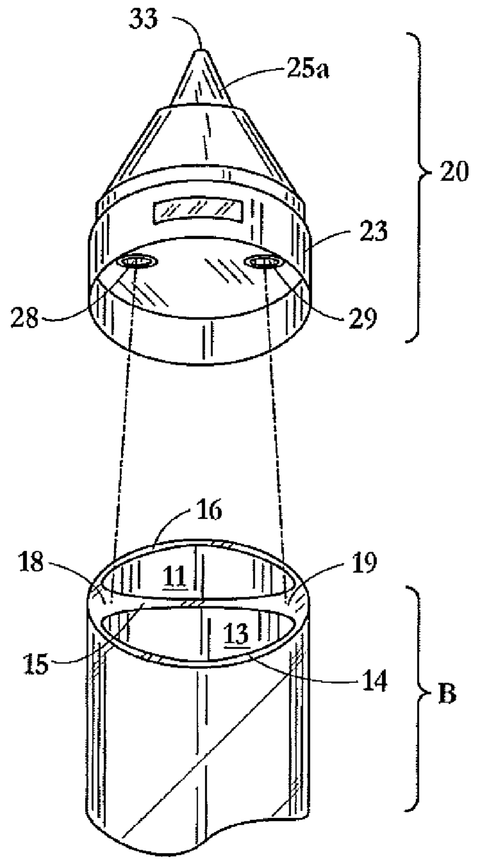
FIG. 2 is a partial perspective view of the chemiluminescent application system shown in FIG. 1, with an upper portion removed.
Figure 3A:
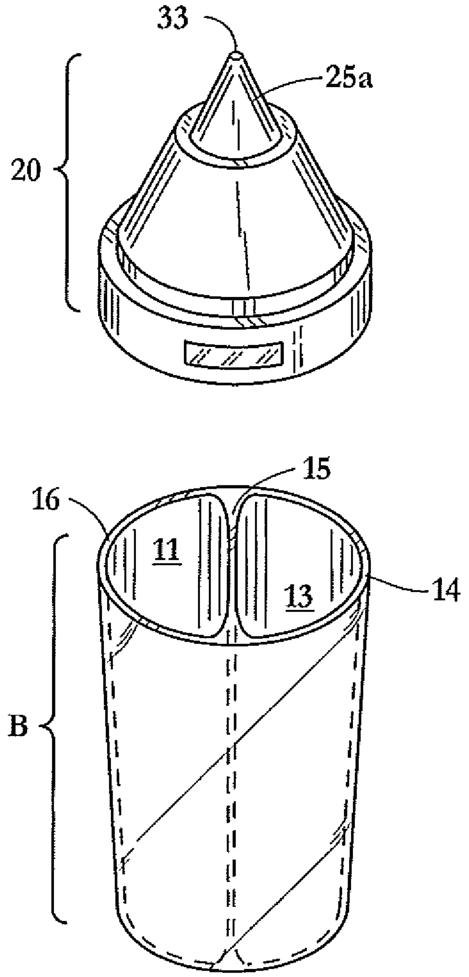
FIG. 3A is a partial perspective view of the chemiluminescent application system shown in FIG. 1, with the upper portion removed.

It is further contemplated that the application element 20 may be a solid piece such that the nozzle 25 and attachment means 23 are incorporated into one element which may be rotated, pivoted, or otherwise manipulated to allow the flow of the chemiluminescent material out of the body of the apparatus 10 through the nozzle 25 as shown in FIG. 2 and nozzle 25 as shown in FIG. 3A. One aspect of the current invention is that the chemiluminescent materials housed in the body of the apparatus 10 preferably do not mix until they are released from the body of the apparatus 10 and travel into or through and out of the application element 20. It is contemplated that the mixing of the reactants and/or fluorescent compound may occur in the application element 20, within the nozzle 25, within a multidirectional nozzle 37 (FIG. 3B), upon release of the chemiluminescent material from the nozzle 25 through one or more orifices 33*a*, when the chemiluminescent material is released from the nozzle 25 through more than one orifice 33*a* and hits a surface, or any combination thereof.

The chemiluminescent material travels from the body of the apparatus 10 to the application element 20 through openings 28, 29 between the body B of the apparatus 10 and the application element 20. The openings 28, 29 may include avenues of communication with the compartments 11, 13 of the body of the apparatus 10, such as, but not limited to tubes, channels, passages, etc. Openings 28, 29 may be configured such that they are plugged or otherwise not in communication with the compartments 11, 13 housing the chemiluminescent material by a sealing mechanism portions 18, 19 which are displaced when pressure is applied to the outer edges 16, 14 of the body of the apparatus 10 or when the application element 20 is rotated or otherwise manipulated in a predetermined manner.

Figure 3B:
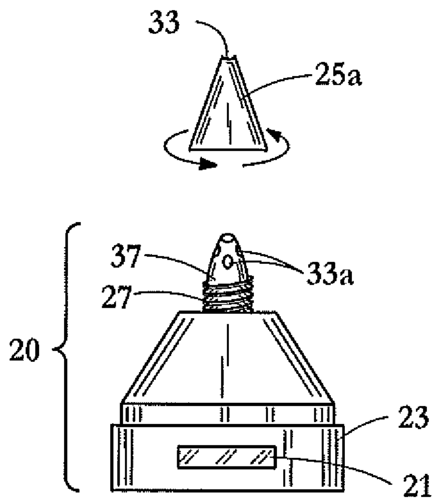
FIG. 3B is an elevational view of the chemiluminescent application system shown in FIG. 1, with a cap removed from the upper portion.

It is further contemplated that the apparatus may be a self-contained unit in which the application element 20 is not removable from the body of the apparatus 10. It is further contemplated that the cap 25*a* may act as a cover for a second nozzle 37 as shown in FIG. 3B. The second nozzle 37 may comprise a multitude of orifices 33*a* through which the chemiluminescent material may pass. The second nozzle 37 may comprise a threaded contour 27 or other means for attaching the cap 25*a* to the application element 20.

In one embodiment of the present invention, one or more of the chemiluminescent materials may be in the form of a powder. In such an embodiment, it is contemplated that the powder may react with water or some other fluid to create illumination. It is contemplated that the powder may be in a gel matrix such that use in a damp environment will produce illumination while allowing the chemiluminescent material to adhere to, or be less susceptible to being washed away and/or dissipated from, a damp surface such as a cave wall or cave floor.

In another embodiment of the present invention, one or more of the chemiluminescent materials are pressurized such that the chemiluminescent material is released from the apparatus in the form of an aerosol.

In another embodiment of the present invention, two or more of the chemiluminescent materials are released through separate orifices in such a manner that the chemiluminescent materials do not mix until they together hit a surface, causing mixing to occur which produces light.

In another embodiment of the present invention, one or more of the chemiluminescent materials may be activated by air such that illumination occurs when the chemiluminescent materials are mixed and exposed to air.

In one embodiment, a chemiluminescent formulation such as disclosed in U.S. Pat. No. 4,089,797, issued to Hester et al., could be used, and the entirety of such patent is incorporated herein by reference.

In another embodiment of the present invention, the body of the apparatus 10 and the application element 20 may be configured in such a way that allows the user to manipulate the apparatus and throw or toss the apparatus after which the chemiluminescent material is released through one or more orifices. In one aspect of such an embodiment, the release of the chemiluminescent material may be dependent on a manipulable or set analog timer, digital timer, or mechanical timer, or a combination thereof.

In another aspect of such an embodiment, the apparatus may further comprise wheels, rollers, or other such means for allowing the apparatus to travel in one or more directions upon resting or landing on a surface.

In another embodiment of the present invention, the chemiluminescent materials, the device, or a combination thereof, additionally contain marking components such as dyes such that the dye remains after illumination has ceased. Examples of such dyes include, but are not limited to, liquid dyes, powder dyes, water soluble dyes, permanent dyes, and combinations thereof. Additional dyes may be used as a chemiluminescent material, such as infrared dyes, ultra violet dyes, chemiluminescent dyes, and combinations thereof. In another aspect, phosphorescent dyes may be used in addition to the chemiluminescent materials and/or dyes.

Certain modifications and improvements will occur to those skilled in the art upon a reading of the foregoing description.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure.

What is claimed is:

1. An apparatus for providing illumination, the apparatus comprising:
a first compartment;
a first reactant in said first compartment;
a second compartment;
a second reactant in said second compartment that reacts upon contact with said first reactant to produce a chemiluminescent material;
an element in communication with said first compartment and said second compartment that selectively allows said first reactant and said second reactant to react to produce said chemiluminescent material; and
a nozzle in communication with said element that selectively dispenses said chemiluminescent material.

2. The apparatus as defined in claim 1, wherein:
said first reactant is an oxalic-type ester; and
said second reactant is a hydroperoxide.

3. The apparatus as defined in claim 1, wherein:
at least one of said first reactant and said second reactant is a powder.

4. The apparatus as defined in claim 1, wherein:
at least one of said first reactant and said second reactant is a dispersion in a fluid.

5. The apparatus as defined in claim 1, wherein:
at least one of said first reactant and said second reactant is from a group consisting of: a polysiloxene, a hydrogen peroxide, potassium permanganate, a manganese peroxide, a chromic acid, a persulfuric acid, a mercurous nitrate, a mercuric nitrate, a ferric chloride, a eerie ammonium sulfate, a eerie ammonium nitrate, a eerie sulfate, a eerie oxide, a cerium nitrate, a potassium hexanitrate cerate, a uranyl nitrate, a uranyl acetate, a potassium ruthenate, a vanadium pentoxide, a chromium trioxide, a magnesium perchlorate, a 5-amino-2,3-dihydro-1,4-phthalazinedione, a copper-doped zinc suflate, a nitrogen monoxide, a methylselenide, a cyanide, a fluoromethylene, a formaldehyde, a hydrogen sulfoxide, aniodine monofluoride, a lucigene, a lucigenin, a lophine, a luciferin, a peroxyoxalate, a tris(2-2'-bipyridyl)ruthenium(III), a sulfur dioxide, a sulfur difluoride, a nitrogen dioxide, a peroxide, a tetrakis (dimethylamino)ethylene, an oxalic acid esters, a isoluminol, a peroxidase, a bis-trichloropheyloxalate, an alkaloid reacted with potassium permaganate in the presence of polyphosphates, a 9,10-bis(phenylethynyl)-anthracene, a 5,6,11,12-tetraphenylnaphthacene, anacridine orange (c.i, 46005), a disodium fluorescein (c.i. 45350:1), a 1-chloro-9,10-bis(phenyl-ethynyl)anthracene, a rhodamine b (c.i. 45170), a rhodamine 6 g perchlorate, a 2-chloro-9,10-bis(phenyl-ethynyl)anthracene, a 5,6,11,12-tetraphenylnaphthacene, a 9,10-diphenylanthracene, a 3-(2'-benzothiazolyl)-7-n,n-diethyl-aminocoumarin, a perylene, a pyrene, a disodium fluorescein, a 5,12-bis(phenylethynyl)-tetracene, a and 16-17-dipeptaonyloxyviolanthrone, and an diethyloxatricarbocyanine.

6. The apparatus as defined in claim 1, further comprising:
a window provided in said element that permits a visual determination of whether said chemiluminescent material is present in said element.

7. The apparatus as defined in claim 1, further comprising:
said first compartment and said second compartment being generally adjacent one another and flexible and configured to be simultaneously squeezed to cause said first reactant and said second reactant to enter said element.

8. The apparatus as defined in claim 1, further comprising:
said first compartment and said second compartment being generally adjacent one another and flexible and configured to be simultaneously squeezed to cause said first reactant and said second reactant to enter said element; and
said element defining a first opening that selectively permits said first reactant to enter said element and a second opening that selectively permits said second reactant to enter said element.

9. The apparatus as defined in claim 1, further comprising:
said first compartment and said second compartment being generally adjacent one another and flexible and configured to substantially simultaneously deliver said first reactant and said second reactant to said element; and
said element defining a first opening that permits said first reactant to enter said element and a second opening that permits said second reactant to enter said element substantially simultaneously as said first reactant enters said element.

10. The apparatus as defined in claim 1, further comprising:
said element defining a first opening that permits said first reactant to enter said element and a second opening that permits said second reactant to enter said element substantially simultaneously as said first reactant enters said element.

11. The apparatus as defined in claim 1, further comprising:
a body member that defines said first compartment and said second compartment; and
said element being configured to move between a sealing position, wherein said element substantially seals said first compartment and said second compartment, and an open position, wherein said first reactant said second reactant may enter said element.

12. The apparatus as defined in claim 1, further comprising:
a body member that defines said first compartment and said second compartment; and
said element being configured to pivot between a sealing position, wherein said element substantially seals said first compartment and said second compartment, and an open position, wherein said first reactant said second reactant may enter said element.

13. The apparatus as defined in claim 1, further comprising:
said nozzle defining a plurality of orifices.

14. The apparatus as defined in claim 1, further comprising:
at least one of said first compartment and said second compartment being pressurized above atmospheric pressure.

15. The apparatus as defined in claim 1, further comprising:
at least one of said first reactant and said second reactant including a dye.

16. The apparatus as defined in claim 1, further comprising:
a timer that automatically causes said first reactant and said second reactant to react to produce said chemiluminescent material.

17. The apparatus as defined in claim 1, further comprising:

said first reactant and said second reactant being selected such that upon said first reactant and said second reactant being mixed and exposed to air, said chemiluminescent material is produced.

18. The apparatus as defined in claim 1, further comprising:

at least one of said first reactant and said second reactant including a fluorescent compound.

19. An apparatus for providing illumination, the apparatus comprising:

a first compartment;

a first material in said first compartment;

a second compartment;

a second material in said second compartment that reacts upon contact with said first material to produce a chemiluminescent material;

an element in communication with said first compartment and said second compartment; and an applicator in communication with said element that selectively simultaneously dispenses said first material and said second material such that upon impact with a surface, said first material and said second reactant contact to produce said chemiluminescent material.

20. An apparatus for providing illumination, the apparatus comprising:

a first compartment;

a first reactant in said first compartment;

a second compartment;

a second reactant in said second compartment that reacts upon contact with said first reactant to produce a fluorescent material;

an element in communication with said first compartment and said second compartment that selectively allows said first reactant and said second reactant to react to produce said fluorescent material; and a nozzle in communication with said element that selectively dispenses said fluorescent material.

21. The apparatus as defined in claim 20, further comprising:

said element being configured to allow said first reactant and said second reactant mix in a predetermined ratio.

22. The apparatus as defined in claim 20, further comprising:

said element being configured to allow said first reactant and said second reactant mix in a predetermined ratio that correlates to a predetermined period of chemiluminescence.

23. A method of providing illumination, the method comprising:

providing a first material in a first compartment;

providing a second material in a second compartment, said second material being selected to react upon contact with said first material to produce a chemiluminescent or fluorescent material;

mixing said first material and said second material to produce said chemiluminescent material; and dispensing said chemiluminescent or fluorescent material through a nozzle and onto a surface such that said surface is illuminated by said chemiluminescent material.

24. The method as defined in claim 23, wherein said first material and said second material are mixed in a predetermined ratio.

25. The method as defined in claim 23, wherein said first material and said second material are mixed in a predetermined ratio that correlates to a predetermined period of chemiluminescence or fluorescence.

* * * * *